(12) United States Patent
Boroski et al.

(10) Patent No.: US 8,011,474 B2
(45) Date of Patent: Sep. 6, 2011

(54) POWERED ACCESS DEVICE

(75) Inventors: Robin M. Boroski, Sugar Grove, IL (US); Miguel A. Palacios, Dekalb, IL (US); Eric R. O'Brien, Yorkville, IL (US); Todd R. Okimoto, Walanae, HI (US); Christopher P. Cherwin, Yorkville, IL (US); Marius G. Enescu, Montgomery, IL (US); Byron D. Collis, Chicago, IL (US); Eric W. Cler, Peoria, IL (US); Kevin L. Duel, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 926 days.

(21) Appl. No.: 11/589,162

(22) Filed: Oct. 30, 2006

(65) Prior Publication Data

US 2008/0099282 A1   May 1, 2008

(51) Int. Cl.
*B60R 3/00* (2006.01)
(52) U.S. Cl. .................................................. 182/127
(58) Field of Classification Search ............... 182/127
See application file for complete search history.

(56) References Cited

U.S. PATENT DOCUMENTS

| | | | |
|---|---|---|---|
| 2,611,466 A | 9/1952 | Biggert et al. | |
| 2,656,058 A | 10/1953 | Foote | |
| 2,683,540 A | 7/1954 | Wood | |
| 3,190,392 A | 6/1965 | Ashton et al. | |
| 3,388,925 A | 6/1968 | Chavira et al. | |
| 3,394,947 A | 7/1968 | Strube, Sr. | |
| 3,396,814 A | 8/1968 | Garnett | |
| 3,408,959 A | 11/1968 | Cripe et al. | |
| 3,446,379 A | 5/1969 | Phillips | |
| 3,498,481 A | 3/1970 | Size | |
| 3,507,515 A | 4/1970 | Brammer | |
| 3,508,627 A | 4/1970 | Lypko et al. | |
| 3,515,243 A | 6/1970 | Ellen, Jr. | |
| 3,517,942 A | 6/1970 | Cuffe et al. | |
| 3,601,220 A | 8/1971 | Saucier | |
| 3,606,382 A | 9/1971 | Pollock | |
| 3,610,367 A | 10/1971 | Atchey | |
| 3,645,409 A * | 2/1972 | Sinclair | 414/795.3 |
| 3,653,463 A | 4/1972 | Neal et al. | |

(Continued)

FOREIGN PATENT DOCUMENTS

DE   32 27 633   3/1983

(Continued)

OTHER PUBLICATIONS

PowerStep Product Line, located at http://www.boazinc.com/powerstep/index.htm, printed Feb. 17, 2005, 12 pages.

*Primary Examiner* — Alvin C Chin-Shue
(74) *Attorney, Agent, or Firm* — Finnegan, Henderson, Farabow, Garrett & Dunner LLP

(57) ABSTRACT

A device for accessing an elevated entry position on a machine including an operator position includes a platform, which includes a step surface, configured to ascend and descend between a base position and the elevated entry position, wherein the platform remains within an existing envelope of the machine throughout ascent, descent, and storage of the platform, and wherein the ascending and descending proceeds along an axis substantially orthogonal to the step surface. The device may further include a lifting mechanism operatively connected to the machine and the platform.

10 Claims, 8 Drawing Sheets

U.S. PATENT DOCUMENTS

| | | | |
|---|---|---|---|
| 3,672,104 | A | 6/1972 | Luckey |
| 3,690,408 | A | 9/1972 | Reske et al. |
| 3,752,327 | A | 8/1973 | Olson |
| 3,762,742 | A | 10/1973 | Bucklen |
| 3,767,007 | A | 10/1973 | Garnett |
| 3,807,757 | A | 4/1974 | Carpenter et al. |
| 3,809,181 | A | 5/1974 | Staranick et al. |
| 3,817,346 | A | 6/1974 | Wehmeyer |
| 3,826,334 | A | 7/1974 | Spillman |
| 3,826,337 | A | 7/1974 | Liptak et al. |
| 3,854,752 | A | 12/1974 | Flint et al. |
| 3,869,022 | A | 3/1975 | Wallk |
| 3,887,217 | A | 6/1975 | Thomas |
| 3,910,383 | A | 10/1975 | Friedl |
| 3,912,299 | A | 10/1975 | Carr |
| 3,981,515 | A | 9/1976 | Rosborough |
| 3,986,724 | A | 10/1976 | Rivinius |
| 3,997,183 | A | 12/1976 | Russey |
| 4,004,695 | A | 1/1977 | Hockensmith et al. |
| 4,020,920 | A | 5/1977 | Abbott |
| 4,021,071 | A | 5/1977 | Norman |
| 4,067,588 | A | 1/1978 | Morge et al. |
| 4,071,260 | A * | 1/1978 | Marshall, Sr. ................ 280/166 |
| 4,073,501 | A * | 2/1978 | Grow ........................ 280/164.1 |
| 4,073,502 | A | 2/1978 | Frank et al. |
| 4,088,200 | A | 5/1978 | Cowley et al. |
| 4,098,371 | A | 7/1978 | Cox |
| 4,108,457 | A | 8/1978 | Garrett |
| 4,116,457 | A | 9/1978 | Nerem et al. |
| 4,119,177 | A | 10/1978 | Andersson |
| 4,185,849 | A | 1/1980 | Jaeger |
| 4,217,971 | A | 8/1980 | Rivinius |
| 4,243,120 | A | 1/1981 | Pratt, Jr. et al. |
| 4,280,589 | A | 7/1981 | Merrick |
| 4,356,894 | A | 11/1982 | Everett |
| 4,497,390 | A | 2/1985 | Wilson |
| 4,623,160 | A | 11/1986 | Trudell |
| 4,673,061 | A | 6/1987 | Zeiset |
| 4,790,495 | A * | 12/1988 | Greathouse et al. ...... 244/110 B |
| 4,930,598 | A | 6/1990 | Murrill et al. |
| 4,982,974 | A | 1/1991 | Guidry |
| 5,033,582 | A | 7/1991 | Hoben |
| 5,064,022 | A * | 11/1991 | Graham ........................ 182/85 |
| 5,092,617 | A | 3/1992 | Jones, Jr. |
| 5,106,256 | A | 4/1992 | Murakami et al. |
| 5,135,074 | A | 8/1992 | Hornagold |
| 5,249,642 | A | 10/1993 | Kishi |
| 5,339,919 | A | 8/1994 | Boyd |
| 5,538,100 | A | 7/1996 | Hedley |
| 5,547,040 | A | 8/1996 | Hanser et al. |
| 5,597,050 | A | 1/1997 | Johnson |
| 5,791,857 | A * | 8/1998 | Ziaylek et al. ................ 414/462 |
| 5,829,370 | A * | 11/1998 | Bender .......................... 111/54 |
| 6,012,545 | A | 1/2000 | Faleide |
| 6,027,131 | A * | 2/2000 | Wijlhuizen .................. 280/166 |
| 6,068,277 | A | 5/2000 | Magnussen |
| 6,178,364 | B1 | 1/2001 | Delurey et al. |
| 6,209,682 | B1 | 4/2001 | Duffy et al. |
| 6,264,222 | B1 * | 7/2001 | Johnston et al. .............. 280/166 |
| 6,264,227 | B1 | 7/2001 | Johnson et al. |
| 6,347,686 | B1 | 2/2002 | Hedley et al. |
| 6,378,654 | B1 | 4/2002 | Ziaylek, Jr. et al. |
| 6,464,037 | B2 | 10/2002 | Baldas et al. |
| 6,640,928 | B1 | 11/2003 | Ridley, Jr. |
| 6,764,126 | B2 * | 7/2004 | Mentink et al. .......... 296/107.01 |
| 6,971,657 | B2 * | 12/2005 | King et al. .................... 280/163 |
| 2003/0173153 | A1 | 9/2003 | Hedley |
| 2006/0124375 | A1 | 6/2006 | Lahr et al. |

FOREIGN PATENT DOCUMENTS

| | | |
|---|---|---|
| EP | 0 778 177 | 6/1997 |
| EP | 1 619 076 | 1/2006 |
| GB | 2180818 A * | 4/1987 |

* cited by examiner

POWERED ACCESS DEVICE

TECHNICAL FIELD

This disclosure relates generally to a powered access device, and more particularly to a powered access device used for accessing an elevated entry position of a machine.

BACKGROUND

Machines, including vocational vehicles, off-highway haul trucks, motor graders, wheel loaders, and other types of large machines associated with construction, mining, and other industries often include operator positions that can be elevated significantly above ground level. The operator position may sometimes be accessible via an intermediate elevated entry position (e.g., a location on the rear bumper surface of a wheel loader) that may be somewhat closer to the ground. Intermediate entry position may be linked to the operator position via a set of stairs or other suitable access device. However, in some instances, even the intermediate elevated entry position may be five feet—or greater—above ground level.

To enable operators to access such elevated entry positions, stationary, fold-out, or other similar steps or ladders have often been provided leading to the elevated entry position on the machine. An operator may mount the ladder and climb up to the elevated entry position using hands and feet. When using such a method to access the elevated entry position, it is preferred that three points of contact be maintained for stability. For example, two hands and a foot or two feet and one hand should remain in contact with the ladder to maintain a stable climbing environment. However, maintaining three points of contact can make carrying items such as toolboxes, lunchboxes, papers, and other items up to the operator position of the machine difficult.

One device for accessing an elevated entry position of a machine is disclosed in U.S. Pat. No. 5,092,617 to Jones, Jr. ("the '617 patent"). The '617 patent discloses a step orthogonally mounted to a pneumatic piston and affixed to a cab of a machine. The device allows an operator to mount the step and actuate a lifting mechanism associated with the pneumatic piston, thereby lifting the operator to the level of the cab.

While the device of the '617 patent may assist an operator in reaching the level of an elevated operator position, the device presents several problems. First, by mounting to the exterior of the machine, the device may expand the envelope of the machine thereby risking collision with and/or sustaining damage from external objects (e.g., wall or doorway of a repair bay). Further, because the device of the '617 patent lacks any system for determining an operational condition of the machine, the device may be operated and/or self operate while the machine is in motion. Such operation may lead to dangerous conditions for both the operator and those surrounding the machine.

The present disclosure is directed at overcoming one or more of the problems or disadvantages in the prior art powered access devices.

SUMMARY OF THE INVENTION

In one aspect, the present disclosure is directed to a device for accessing an elevated entry position on a machine including an operator position. The device may include a platform including a step surface, configured to ascend and descend between a base position and the elevated entry position, wherein the platform remains within an existing envelope of the machine throughout ascent, descent, and storage of the platform, and wherein the ascending and descending proceeds along an axis substantially orthogonal to the step surface. The device may further include a lifting mechanism operatively connected to the machine and the platform.

In another aspect, the present disclosure is directed to a method for controlling access to an elevated position on a machine. The method may include the steps of receiving a command to operate a device. The device may include a platform including a step surface, configured to ascend and descend between a base position and the elevated entry position, wherein the platform remains within an existing envelope of the machine throughout ascent, descent, and storage of the platform, a lifting mechanism operatively connected to the machine and the platform, and one or more controllers associated with the lifting mechanism and including a communicative connection to at least one sensing system configured to sense an operational state of the machine. The method may further include determining, from the sensing system, an operational state of the machine and conditionally providing power to the lifting mechanism based on the operational state of the machine.

In yet another aspect, the present disclosure is directed to a machine. The machine may include a frame, a traction device operatively connected to the frame, an elevated entry position connected to the frame, and a device configured to access the elevated entry position. The device may include a platform, including a step surface, configured to ascend and descend between a base position and the elevated entry position, wherein the platform remains within an existing envelope of the machine throughout ascent, descent, and storage of the platform, a lifting mechanism operatively connected to the machine and the platform, and one or more controllers associated with the lifting mechanism and including a communicative connection to at least one sensing system configured to sense an operational state of the machine.

In yet another aspect, the present disclosure is directed to a machine. The machine may include a frame, a traction device operatively connected to the frame, and an elevated surface configured to form a walkway affixed to the frame such that an operator may navigate the walkway from a first area of the machine to a second area of the machine. Further, a portion of the walkway may be configured to move between a position level with the elevated surface and a position closer to ground level.

DETAILED DESCRIPTION

Figure 1A:
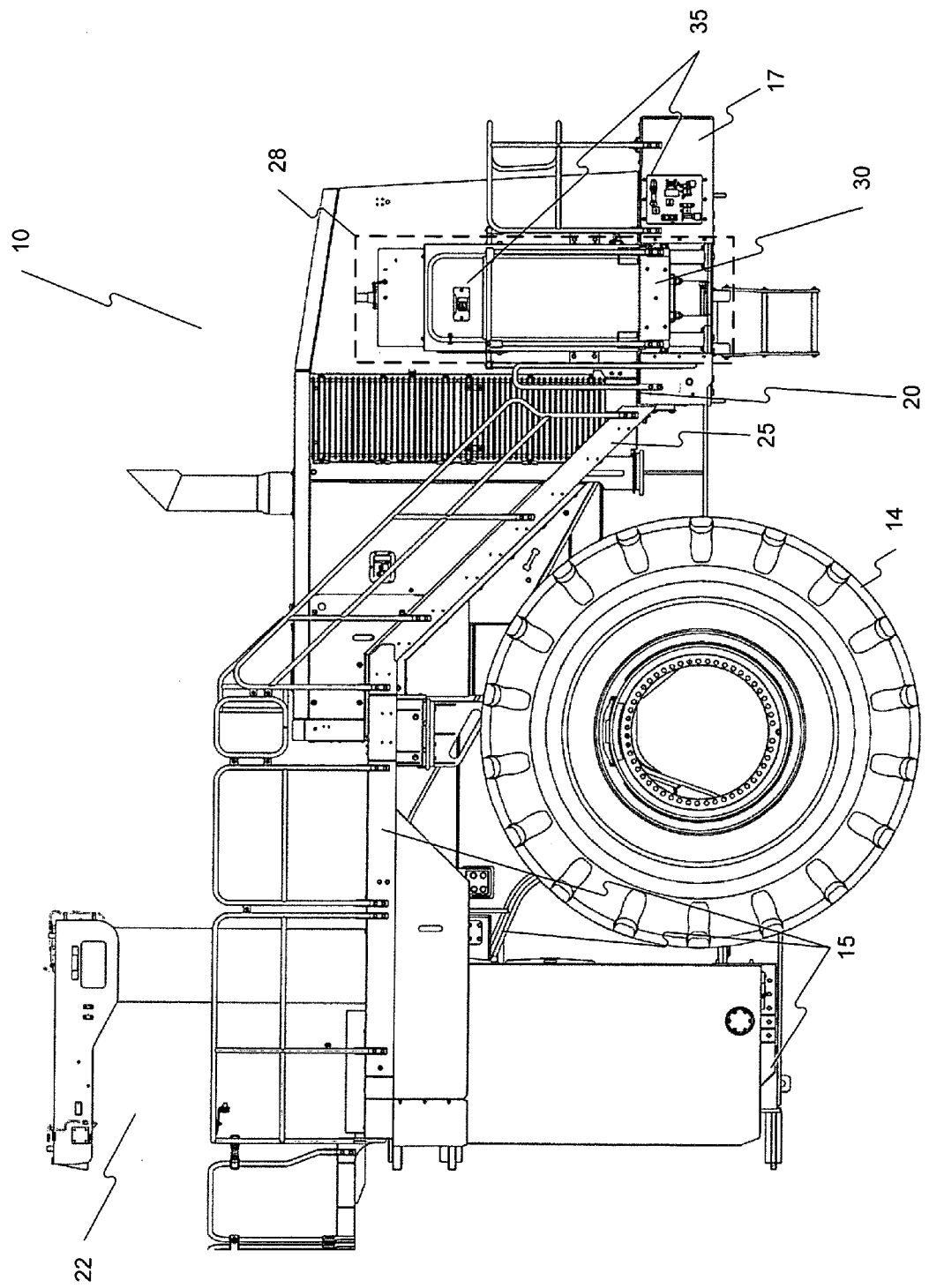
FIG. 1A illustrates a side elevation of an exemplary embodiment of a machine.

FIG. 1A illustrates a side elevation of an exemplary embodiment of a machine 10. Machine 10 may embody a mobile vehicle configured to perform some type of operation associated with an industry such as transportation, mining, construction, farming, or any other industry known in the art. For example, machine 10 may be an earth moving machine such as a haul truck, a hydraulic shovel, dragline, a wheel loader, a hydraulic excavator, a motor grader, or any other suitable machine. Machine 10 may include at least one traction device 14 operatively connected to a frame 15 and driven by a power system (not shown). Machine 10 may also include a bumper 17, an elevated entry position 20, an operator position 22, an operator access 25, a park brake (not shown), a transmission (not shown), and a powered access device 28.

Traction devices 14 may include wheels located on each side of machine 10. Alternately, traction devices 14 may include tracks, belts or other known traction devices. It is contemplated that any of the traction devices 14 on machine 10 may be driven and/or steered.

A transmission (not shown) and park brake (not shown) may be operatively connected to traction devices 14 and designed to enable or prevent motion of machine 10 respectively. Transmission (not shown) may include any suitable power transmitting apparatus (e.g., single- or multi-geared power transmission). Transmission (not shown) can be engaged in a forward gear, a reverse gear, or a neutral gear, resulting in associated motion (or lack thereof) of machine 10. Transmission (not shown) may also include sensing mechanisms enabling a determination as to motion of machine 10, selected gear/neutral position of transmission (not shown), among other things. Such sensing mechanisms may include electronic and/or mechanical sensors and may be communicatively connected to an electronic control module (ECM), controllers 35, and/or other suitable devices.

Park brake (not shown) may include any suitable braking system (e.g., pads, transmission brake, etc.), or combination of braking systems. Park brake (not shown) may be engaged or disengaged and may also include sensing mechanisms enabling a determination as to state of park brake (not shown). For example, such sensing mechanisms may be configured to sense a condition of the park brake actuator (e.g., a handle) and/or may be configured to sense pressure in a hydraulic braking system or a spring associated with the park brake actuator, among other things. Such sensing mechanisms may include electronic and/or mechanical sensors and may be communicatively connected to an electronic control module (e.g., controllers 35) and/or other suitable devices.

Operator position 22 may be elevated above ground level and may house an information console (not shown). In particular, operator position 22 may include a seat (not shown), with information console (not shown) being visible from seat (not shown). Information console (not shown) may include a display communicatively connected to an electronic control module of machine 10 or other suitable device for providing information. Information console (not shown) may be configured to provide information, alerts, warnings, etc., related to machine 10. For example, information console (not shown) may be configured to provide a pop-up warning indicating conditions for operation of machine 10 are unsafe.

Elevated entry position 20 may be configured to provide a first level of access to machine 10. Because machine 10 may be large, machine 10 may include multiple levels and devices (e.g., staircases, ladders, etc.) at such levels for accessing operator position 22. In one embodiment, elevated entry position 20 may be between about 5 feet and 15 feet above ground level (or greater) while operator position 22 may be located at higher elevations. Elevated entry position 20 and operator position 22 may be higher or lower without departing from the scope of the present disclosure.

Elevated entry position 20 may include any internal or external surface of machine 10. For example, elevated entry position 20 may include the top surface of bumper 17 (e.g., the rear bumper of a wheel loader) affixed to frame 15. Further, the top surface of bumper 17 may form an elevated walkway around machine 10 allowing an operator to navigate from one area of machine 10 to another area of machine 10 (e.g., elevated entry position 20), as well as enabling entry to operator access 25.

Operator access 25 may extend from elevated entry position 20 to operator position 22. Operator access 25 may include steps, ladders, powered access devices, and any other suitable devices used for ascending or descending through various elevations. Operator access 25 may provide a path for an operator to ascend to operator position 22 or descend to elevated entry position 20. Alternatively, operator access 25 may not be present and an operator may access operator position 22 directly from elevated entry position 20. One of skill in the art will recognize that multiple configurations of operator access 25 and operator position 22 may exist without departing from the scope of the present disclosure.

Figure 1B:
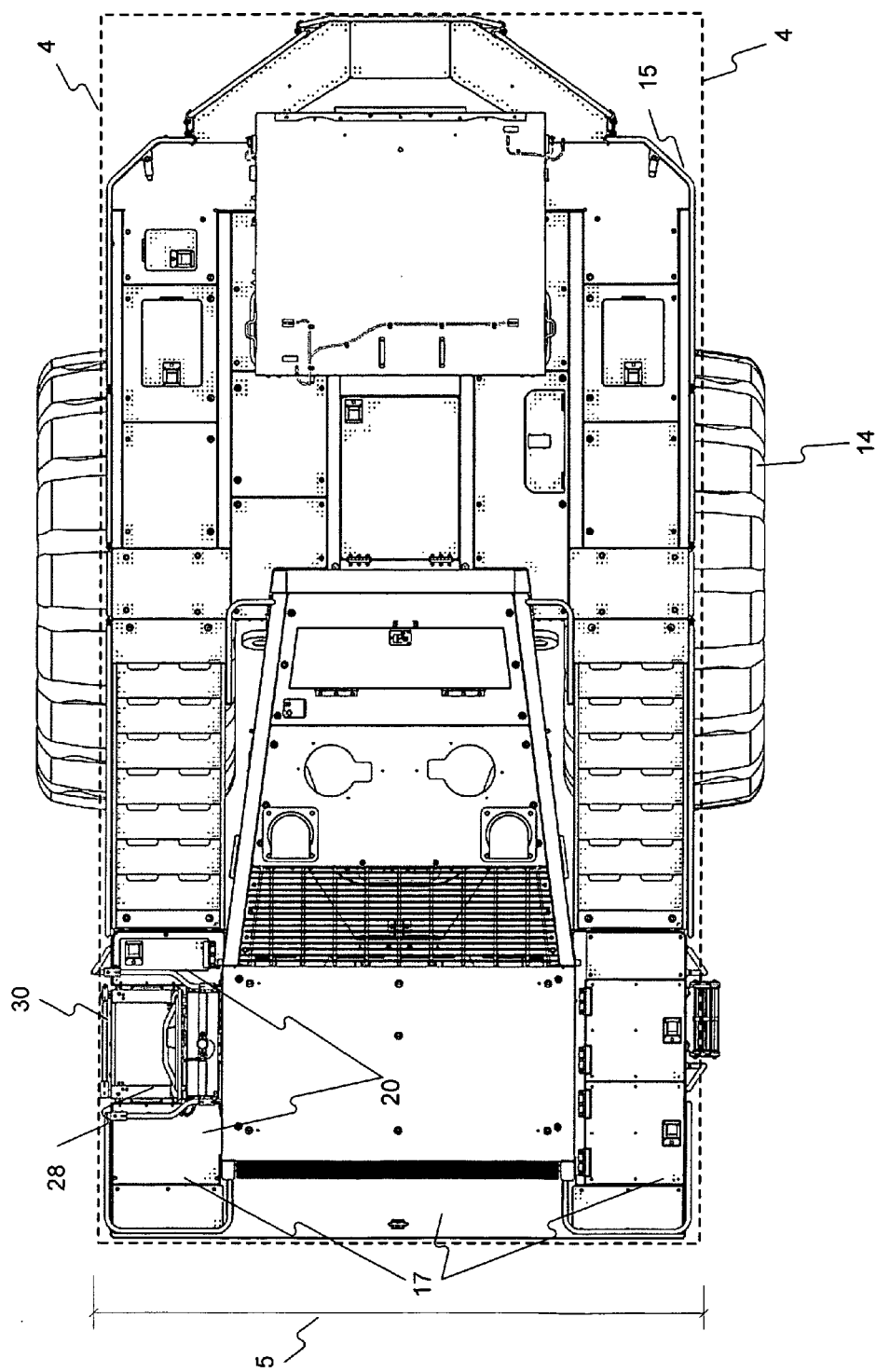
FIG. 1B illustrates a top down elevation of an exemplary embodiment of a machine.

FIG. 1B illustrates a top down elevation of an exemplary embodiment of a machine 10. As shown in FIG. 1B, machine perimeter 4 of machine 10 may define an existing envelope of machine 10. Machine envelope, also known as a shell, as used herein may be defined as a trace around the outermost points of machine 10. In other words, the maximum dimensions of machine 10, taken at points around machine 10 may define the machine envelope. Traction devices 14 may not be included when determining machine envelope as the size of such devices may vary widely based on an intended use for machine 10. For example, measuring machine 10 from one outer edge of bumper 17 to another outer edge of bumper 17 (as shown by bumper dimension 5) may define a portion of machine perimeter 4 and, therefore, a portion of the machine envelope. Similar measurements may be taken around machine 10 to further define the envelope of machine 10 as shown by machine perimeter 4.

As shown in FIG. 1B, components of powered access device 28 may remain substantially within the envelope of machine 10 as defined by machine perimeter 4. This may be true throughout ascent, descent, and storage of components of powered access device 28. For example, as seen in FIG. 1B, platform 30 remains substantially within machine perimeter 4. Further, platform 30 may ascend and descend along an axis substantially orthogonal to platform 30, thereby permitting platform 30 to remain substantially within the machine envelope as shown be machine perimeter 4.

Figure 2A:
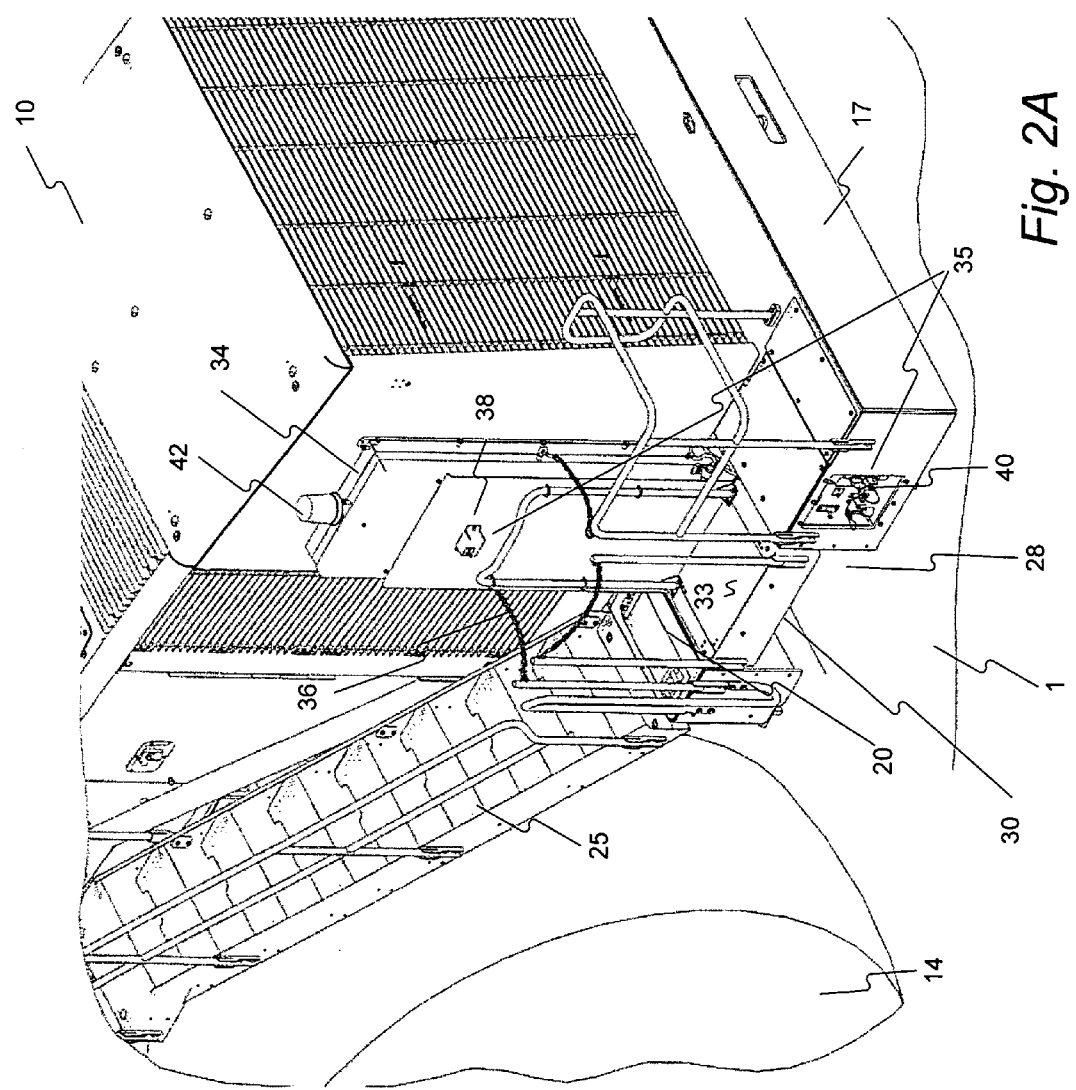
FIG. 2A is an exemplary perspective illustration of a section of an exemplary machine including a powered access device in the raised position.
Figure 2B:
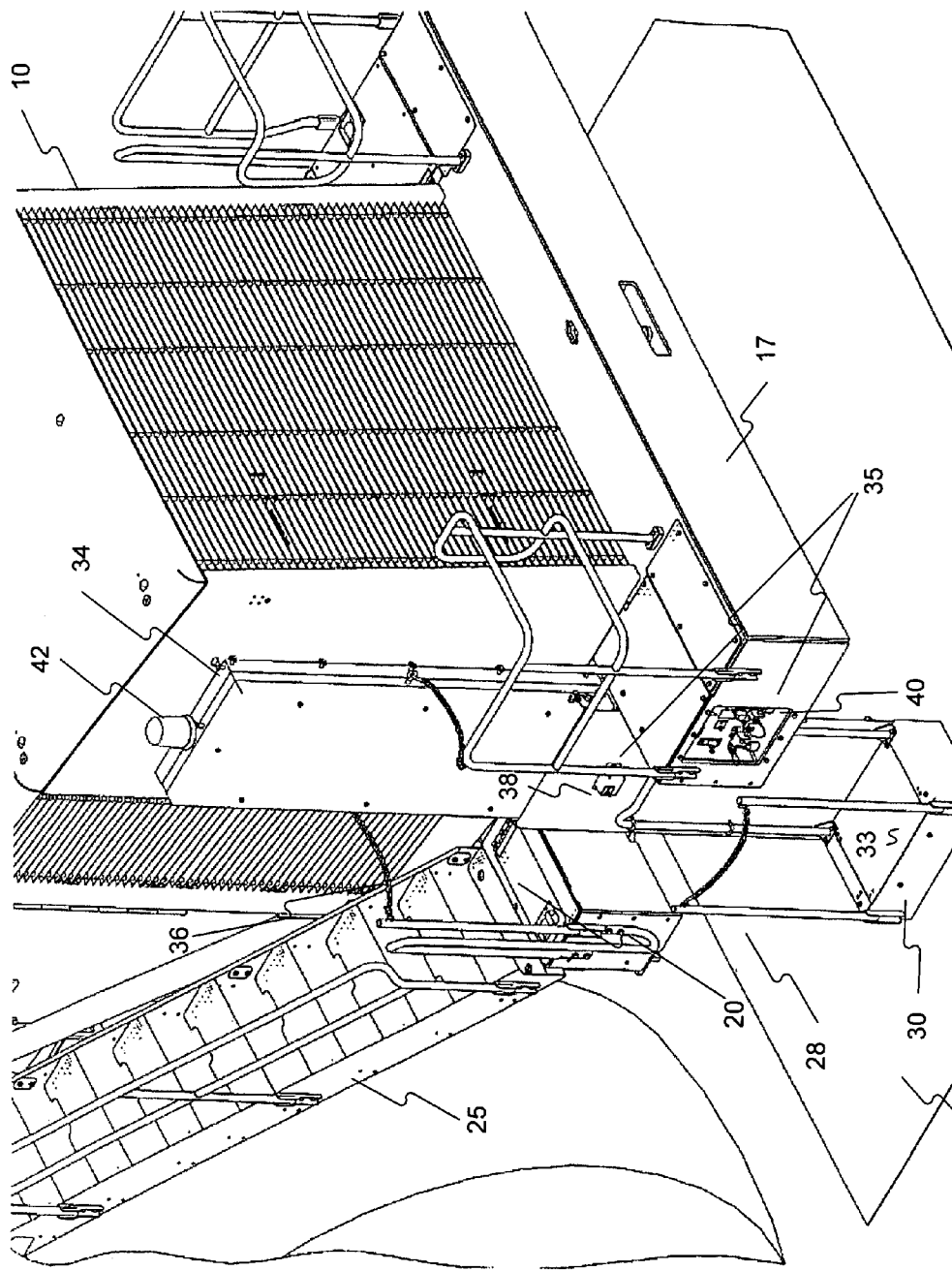
FIG. 2B is an exemplary perspective illustration of a section of an exemplary machine including a powered access device in the lowered position.

FIG. 2A is an exemplary perspective illustration of a section of machine 10 including a powered access device 28 in the raised position, while FIG. 2B depicts powered access device 28 in the lowered position. Powered access device 28 may be configured to provide access from a base position 1 (e.g., ground level) to elevated entry position 20. Powered access device 28 may include a platform 30, one or more controllers 35, safety devices 36, a lifting mechanism 34, and warning devices 42. Powered access device 28 may also include more or fewer elements as desired. For example, powered access device may not include warning devices 42 or additional safety devices may be added to powered access device 28 without departing from the scope of the present disclosure.

Powered access device 28 may be configured such that visual access from operator position 22 to any point below the level of the elevated entry position 20 remains substantially unchanged upon installation of components associated with the device. For example, a bystander near machine 10 and visible from operator position 22 prior to installation of powered access device 28, may remain visible from operator position 22 following installation of powered access device 28.

Platform 30 may be configured to allow for at least two points of contact between an operator and powered access device 28 (e.g., two human feet standing on platform 30). Therefore, platform 30 may include a step surface 33 aligned to enable two-point contact (e.g., substantially horizontal with respect to the ground). Further, because two points of access may be enabled by platform 30, three or more total points of contact may be enabled by powered access device 28. For example, an operator may maintain two feet continuously on platform 30, while one hand is used to operate a controller and/or grasp a railing. Such an arrangement may leave the operator's other hand free to carry items (e.g., lunchbox, papers, tools, etc.) while reducing movement of the operator in attaining an elevated entry position. Alternatively, an operator may place items on platform 30 while maintaining four points of contact (e.g., two feet on platform 30, one hand on controller, one hand on railing). One of skill in the art will recognize that other configurations may be used without departing from the scope of the present disclosure.

Platform 30 and step surface 33 may make up a portion of a walkway surrounding machine 10. For example, platform 30 and step surface 33 may be integral with bumper 17 of machine 10, which may form such a walkway around machine 10. Platform 30 and step surface 33 (as well as bumper 17 and/or other walkway surfaces) may be constructed from materials including, for example, steel, aluminum, and stainless steel, among other suitable materials. Such materials may be manufactured in sheet or other form and may be cut to create a surface of desired size. In addition, step surface 33 of platform 30, as well as walkway surfaces, may include additional surface treatments and patterns such as slip-resistant coatings, diamond tread designs, gratings, etc. One of skill in the art will recognize that numerous treatments and/or patterns may be used on platform 30 without departing from the scope of the present disclosure.

Platform 30 may be configured to ascend and descend between a base position 1 (e.g., ground level) and elevated entry position 20. FIG. 2B illustrates one embodiment consistent with the disclosure, at base position 1, step surface 33 of platform 30 may be approximately 400 millimeters or less above ground level. This may allow an operator to mount platform 30 with a stepping motion. Further, following ascent of platform 30 from base position 1 to a predetermined upper lift height, step surface 33 of platform 30 may be substantially aligned with a top surface of elevated entry position 20. In other words, the difference in height between top of step surface 33 and elevated entry position may be very small or nearly zero such that an operator may step directly from platform 30 to elevated entry position 20.

Figure 2C:
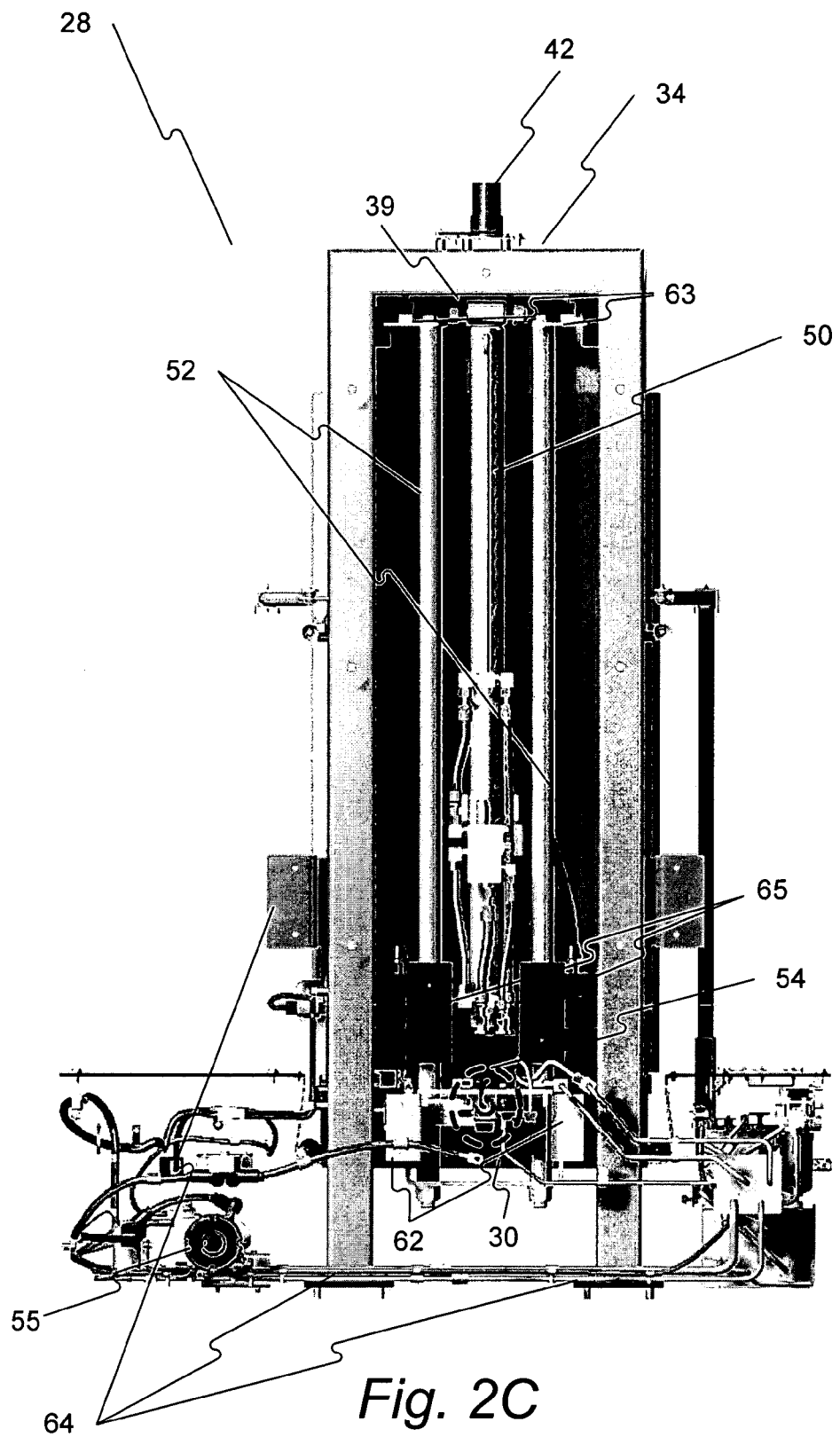
FIG. 2C FIG. illustrates one exemplary embodiment of a lifting mechanism associated with a powered access device.

Ascent and descent of platform 30 may be configured to proceed along an axis substantially orthogonal to step surface 33. In other words, platform 30 may operate in a substantially vertical straight line with respect to the ground. Such motion may be enabled via lifting mechanism 34. FIG. 2C illustrates one exemplary embodiment of lifting mechanism 34. Lifting mechanism 34 may include a hydraulic cylinder 50, slide rails 52, a latching mechanism 54, slide guides 65, and frame mounts 64, among other things. Lifting mechanism 34 may further include an electric motor (not shown) operatively connected to a hydraulic pump 55 configured to impart motion to a fluid associated with hydraulic cylinder 50. Hydraulic pump 55 may include a variable displacement pump, a variable flow pump, or any other source of pressurized fluid known in the art. For example, hydraulic pump 55 may be a variable flow pump. In another embodiment, hydraulic fluid associated with hydraulic cylinder 50 may be pumped using existing implement pumps or other pumps available on machine 10. Further, other suitable configurations for lifting mechanism 34 may also be used, for example, a pneumatic configuration, an electric motor configuration, and/or a manual labor mechanism.

Platform 30 may be operatively connected to each end of slide rails 52 via platform mounts 62 and top brackets 63. Hydraulic cylinder 50 may be mounted to platform 30 and lifting mechanism frame 39 via suitable mounting hardware. Lifting mechanism 34 may, in turn, be operatively connected to frame 15 by frame mounts 64. Slide guides 65 may provide a slidable interface for slide rails 52, thereby limiting platform 30 to motion substantially orthogonal to step surface 33. Therefore, a sliding action of the piston within hydraulic cylinder 50 in response to hydraulic fluid pressures may impart motion to platform 30 such that slide rails 52 slide within slide guides 65 as platform 30 moves between base position 1 and elevated entry position 20. Such motion may take place in a path substantially orthogonal to step surface 33 as substantially determined by slide guides 65 and slide rails 52. Further, the use of slide rails 52 and slide guides 65 may provide additional support to the platform 30 such that forces acting on platform 30 need not be counteracted by forces in hydraulic cylinder 50. More or fewer components may be associated with lifting mechanism 34 as desired.

Figure 2D:
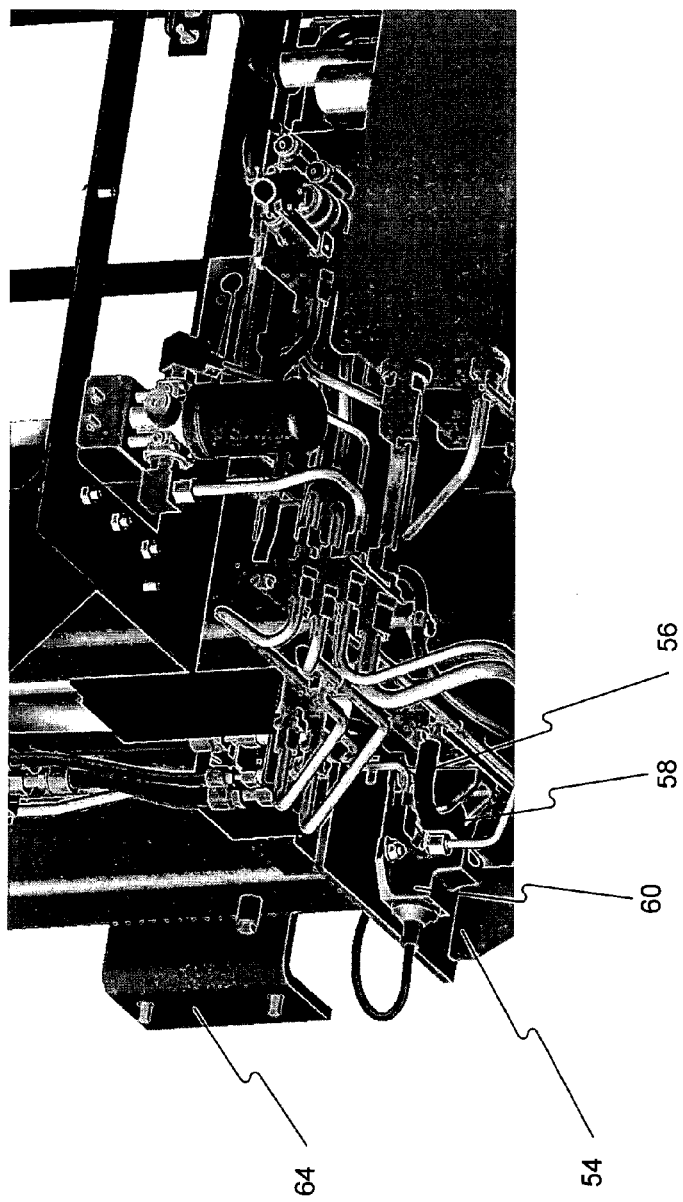
FIG. 2D illustrates one exemplary embodiment of a latching mechanism associated with a powered access device.

Platform 30 may be configured to lock into place upon reaching the predetermined upper lift height (e.g., where step surface 33 meets substantially flush with elevated entry position 20). Locking or storage of platform 30 at the predetermined upper lift height may be enabled via latching mechanism 54 or other suitable mechanism configured to close upon full ascent of platform 30. FIG. 2D illustrates one exemplary embodiment of a latching mechanism associated with powered access device 28. Latching mechanism 54 may include hawksbill latches, slam latches, spring loaded pins, striker plates, hydraulic actuators, and any other combination of suitable mechanisms. For example, latch striker 56 may include any surface configured to enable latching (e.g., loop, hook, etc.) and may be affixed to frame 15 via any suitable fastening device (e.g., bolts). Upon reaching a predetermined upper lift height, a latching component 58 (e.g., a hawk's-bill latch or other appropriately shaped element) may contact latch striker 56, which may cause latching component 58 to engage latch striker 56. Hydraulic latch actuator 60 may then cause latching component 58 to remain engaged to latch striker 56 until an appropriate hydraulic pressure signal is sent to hydraulic latch actuator 60 causing hydraulic latch actuator 60 to disengage latching component 58 from latch striker 56 (e.g., upon a lower command received from controllers 35). One of skill in the art will recognize that numerous other latching configurations may be used without departing from the scope of the present disclosure.

Latching mechanism 54 may further include sensors for sensing the positional state of platform 30 (e.g., raised and locked and not raised). Such sensors may be communicatively connected to controllers 35 or other suitable connection for providing platform position state information. For example, upon disengagement of latching component 58 from latch striker 56 (e.g., hydraulic actuator 60 forces disengagement), a positional state of platform 30 may become "not raised."

Actions associated with lifting mechanism 34 may be controlled via one or more controllers 35 associated with lifting mechanism 34. Controllers 35 may include momentary switches, safety switches, locked switches, simple switches, and other suitable switching devices. In one embodiment, three position momentary switches may be used such that actuation of the switch to a first position may cause ascent of platform 30, while actuation of the switch to a second position may cause descent of platform 30. Upon release of the switch, the switch may return to a neutral position wherein platform 30 may remain stationary or return to a desired position. Additionally, controllers 35 may include enable switches that may prevent actuation of controllers 35 and/or operation of powered access device 28 unless placed in an enabled position. Such enable switches may include two position switches or any other suitable switch known in the art.

Controllers 35 may also include integrated circuits and/or other suitable components configured to implement interlocks and/or other safety features. An interlock, as used herein, may include any device used to help prevent a machine from harming its operator and/or others, or damaging the machine, by precluding an operation of the machine upon a detected condition. For example, an operator may be precluded from lowering platform 30 when an operational status of machine 10 is indicative of machine 10 being in motion.

Electrical power may be provided to controllers 35 continuously regardless of the operational state of machine 10. For example, when a primary power source associated with machine 10 is not running, electrical power may be provided to controllers 35 from a battery or other power source (e.g., fuel cell) associated with machine 10. When the primary power source is running, power may be provided to controllers 35 from a generator associated with the primary power source or other suitable device. Alternatively, controllers 35 may receive power only when a primary power source associated with machine 10 is running and/or when an associated enable switch is in the enabled position.

Controllers 35 may further include communicative connections to sensing devices configured to sense an operational state of the machine (e.g., running/not running and in motion/not in motion) and actuation of other available controllers associated with powered access device 28. For example, controllers 35 may include communicative connections to an electronic control module (ECM) of machine 10 and a pressure sensor associated with park brake (not shown), among other things. ECMs and other devices may sense or determine (e.g., from transmission, engine, park brake, or other suitable sensor) an operational state of machine 10 (e.g., in motion/not in motion, engine running/engine not running). Alternatively, controllers 35 may include communicative connections to a transmission sensor, a traction device sensor, and/or other suitable sensors for sensing an operating condition of machine 10.

Any number of controllers 35 and/or related devices may be provided for controlling operation of powered access device 28. For example, in one embodiment, power to lifting mechanism 34 may be controlled via a first controller 38 associated with platform 30 and/or a second controller 40 associated with machine 10. In another embodiment, only a controller associated with platform 30 may be provided, or a controller associated with machine 10 may be the only control. In addition, a controller may be provided at operator position 22. Where multiple controllers 35 are provided, controllers 35 may sense whether another controller associated with powered access device 28 is currently being actuated. Where simultaneous commands from multiple controllers 35 differ, algorithms may be provided to determine which of the commands should prevail.

Safety devices 36 may also be provided on powered access device. Safety devices 36 may include chains, walls, shields, curtains, and other devices configured to prevent an operator from falling, coming into contact with moving components, or otherwise incurring bodily injury. For example, safety devices 36 may include kick plates at foot level and chains at chest level, both surrounding platform to aid in the prevention of an operator from falling from platform 30. Alternatively, chains and kick plates may be replaced by solid curtains, which may aid in preventing protrusion of objects outside powered access device 28 and machine envelopes. Further, a shield may be provided between lifting mechanism 34 and platform 30 such that an operator may be protected from moving parts associated with lifting mechanism 34. More or fewer safety devices 36 may be present as desired or mandated by regulation.

Figure 2E:
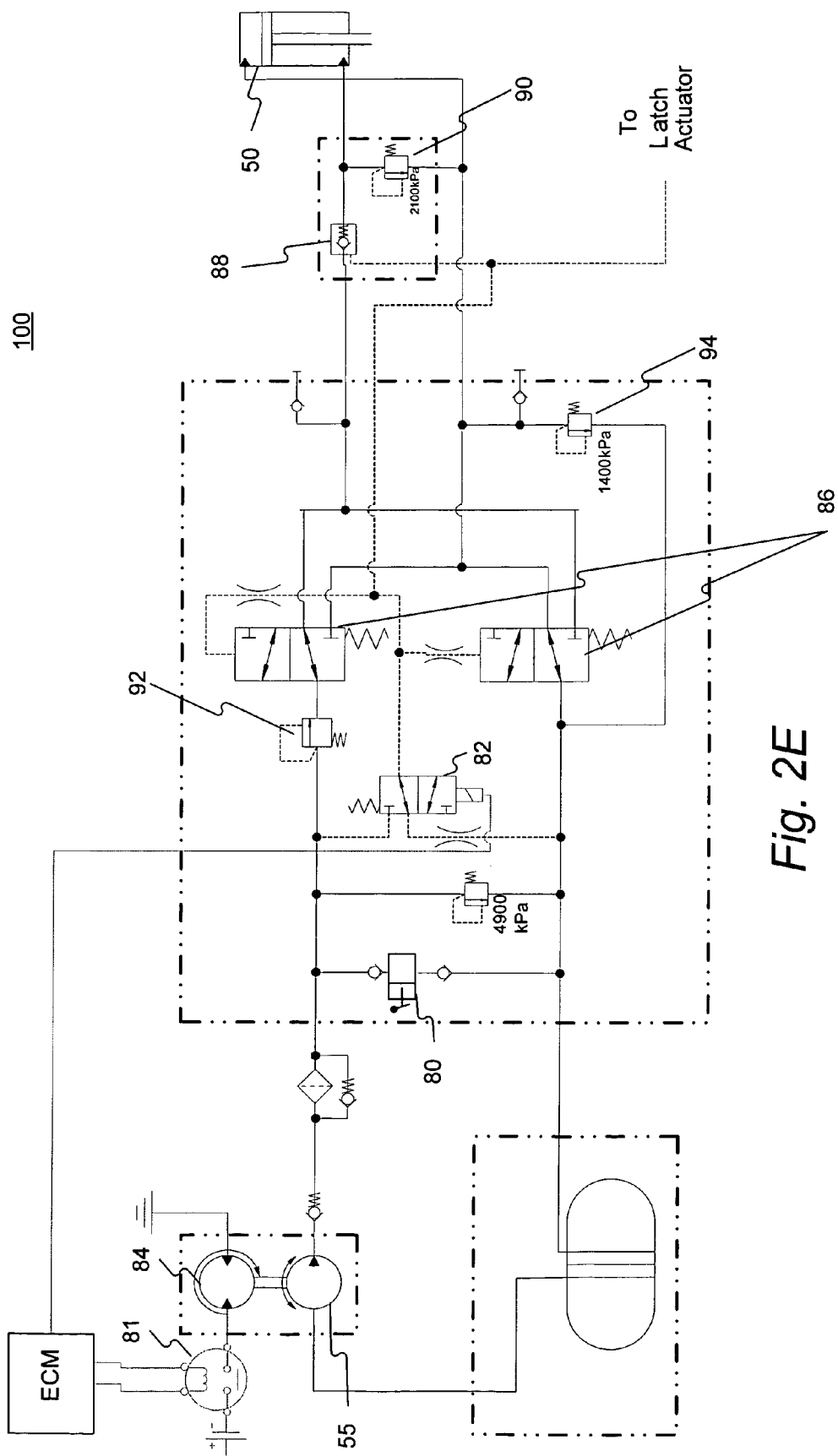
FIG. 2E is an exemplary hydraulic schematic associated with a powered access device.

FIG. 2E is an exemplary schematic of a hydraulic circuit 100 associated with lifting mechanism 34 of powered access device 28. Hydraulic circuit may include a safety lifting mechanism 80, a solenoid valve 82, a motor 84, pilot operated directional spool valves 86, pilot operated check valve 88, weight relief valve 90, sequence valve 92, and safety relief valve 94, among other things.

Motor 84 may be operatively connected to a relay 81, which may, in turn, be operatively or communicatively connected to an ECM associated with machine 10. Motor 84 may be operatively connected to hydraulic pump 55 and configured to drive hydraulic pump 55 to generate a flow of pressurized fluid. ECM may control when power may be applied to motor 84 via relay 81 based on controllers 35 and operational states of machine 10. For example, where a command is received to lower platform 30, and a machine operational state is not in motion and park brake engaged, ECM may actuate relay 81 causing power to be supplied to motor 84 and a flow of pressurized fluid to be generated by hydraulic pump 55. Because pilot operated directional spool valves 86 and solenoid valve 82 may be spring biased to the "raise" position, a minimum pressure (e.g., 300 PSI) for lowering platform 30 may be set using sequence valve 92 and/or other suitable devices. Further, pilot operated check valve 88 may be configured to remain closed until minimum pressure is reached, thereby preventing flow out of the rod end of hydraulic cylinder 50 (limiting or preventing float down). In other words, sequence valve 92, solenoid valve 82, pilot operated check valve 88, and pilot operated directional spool valves 86 may operate together to ensure that a minimum pressure is reached within hydraulic circuit 100 before platform 30 may be lowered. In one embodiment, this minimum pressure may be associated with a pressure desired to release latching mechanism 54. Therefore, when hydraulic circuit pressure reaches the predetermined minimum pressure, latching mechanism 54 may unlatch, pilot operated check valve 88 may open, and platform 30 may be allowed to descend. Pilot operated directional spool valves 86 may then cause the pressurized fluid to be provided to hydraulic cylinder 50 based on the command from controller 35 (e.g., to head end for lowering). Because pilot operated directional spool valves 86 and solenoid valve 82 may be spring biased to the "raise" position, minimum circuit pressure may not be reached for "raise" commands, and the platform raised anytime power is applied to motor 84.

ECM may further be communicatively connected to solenoid valve 82 and may cause solenoid valve 82 to open and close based on various conditions of controllers 35 and operational states of machine 10 to prevent operation of lifting mechanism 34.

In another embodiment, safety lifting mechanism 80 may allow for manual input to move platform 30 from base position 1 to elevated entry position 20 and vice versa. For example, safety lifting mechanism 80 may include a manual input device operatively connected to a hydraulic pump and configured to generate hydraulic pressure within hydraulic circuit 100. Because pilot operated directional spool valves 86 and solenoid valve 82 may be spring biased to the "raise" position, solenoid valve 82 may also include a manual lever or knob for biasing solenoid valve 82 to the "lower" position. In the event that operation of lifting mechanism 34 is impaired or disabled (e.g., battery and/or engine not operational, interlock failure, etc.), an operator may still ascend and/or descend between elevated entry position 20 and base position 1 on platform 30. Upon recognizing that lifting mechanism 34 is unavailable, an operator may operate safety lifting mechanism 80 causing pressure within hydraulic circuit 100 to increase and motion of platform 30. Further, although positive pressure may be used to lower powered access device 28, in other embodiments (e.g., where pilot operated check valve 80 is modified) it may be possible to depressurize lifting mechanism 34, thereby allowing platform 30 to "float" down from elevated entry position 20.

Other safety functions may be incorporated into hydraulic circuit 100. For example, safety relief valve 94 may prevent platform 30 from being "forced" downward when an obstruction exists beneath platform 30. Further, weight relief valve 90 may prevent platform 30 from being overloaded by allowing pressure exceeding a desired pressure (correlating to weight on platform 30) to be relieved. One of skill in the art will recognize that numerous other variations may be utilized without departing from the scope of the present disclosure.

Warning devices 42 may also be associated with powered access device 28. Warning devices 42 may include sirens, lights, informational displays, and other suitable devices for alerting others to the operation of powered access device 28. For example, upon actuating controllers 35, a warning light may begin flashing and/or a warning siren may emit an identifiable tone to alert others to remain clear of operating powered access device 28. In another example, an operator may receive a warning indicator on informational display 26 and/or other device near operator position 22, upon actuation of controllers 35. Warning devices 42 may be mounted on machine 10, on powered access device 28, or in another desired location. One of skill in the art will recognize that numerous configurations for warning devices 42 may be used without departing from the scope of the present disclosure.

INDUSTRIAL APPLICABILITY

Embodiments of the present disclosure may be applicable to any machine having an elevated entry position, such as a medium or large wheel loader. The disclosed system and method may allow an operator of a machine to easily and safely reach an elevated entry position using two points of contact (e.g., two feet) while carrying lunchboxes, toolboxes, papers, and other items to the operator position of the machine. Further, utilizing the system and method of the present disclosure may prevent collisions from occurring with the disclosed powered access device by maintaining the device within a machine envelope.

Figure 3:
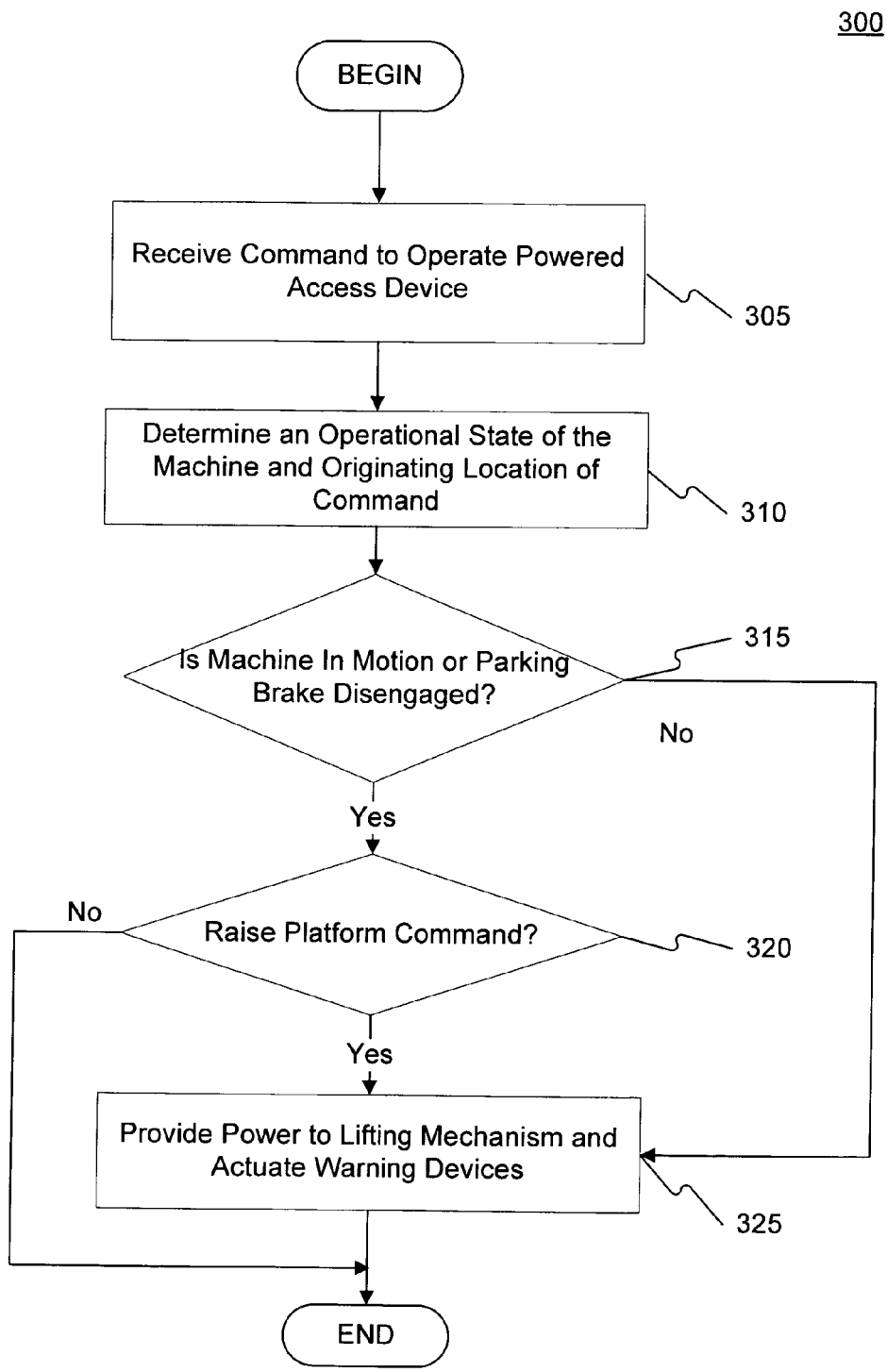
FIG. 3 is a flowchart of an exemplary method for controlling access to an elevated entry position on a machine.

FIG. 3 is a flowchart 300 of an exemplary method for controlling access to a an elevated entry position on a machine. A command may be received to operate the powered access device (step 305). Such a command may originate at one or more controllers associated with platform 30, machine 10, or other controller. The command may indicate that the platform should be raised or lowered. Upon receiving the command, an operational state of machine 10 and the originating location of the command may be determined for use in evaluating whether an interlock should preclude operation of powered access device 28 (step 310). The determination may be made via a sensing system and logic associated with one of the one or more controllers 35. Additionally, the sensing system may be enabled to make such a determination using logic present within the sensing system. If the determined operational state is indicative of machine 10 being in motion or park brake disengaged (step 315: yes), it may be desired to next evaluate the command type (e.g., raise or lower) and the location from which the command originated. In one embodiment, if the command indicates that the platform should be raised (step 320: yes), then power may be provided to lifting mechanism 34, warning devices 42 may be actuated, and platform 30 raised (step 325). Alternatively, if the command indicates that platform 30 should be lowered (step 320: no), and/or where the command originates from a controller associated with machine 10 (e.g., second controller 40), no power may be provided to lifting mechanism 34 and platform 30 may not be moved (step 320: no). If the determined operational state of machine 10 is indicative of machine 10 not being in motion and park brake engaged (step 315: no), then power may be provided to lifting mechanism 34, warning devices 34 actuated, and platform 30 raised or lowered (step 325).

Other interlocks and warnings may also be utilized, for example, a positional state of platform 30 may be monitored via sensing systems. Positions indicative of raised and locked and not raised may be determined and, based on the determination, may cause warnings to be issued to an operator and interlocks to be triggered. For example, upon full ascent and latching of platform 30, platform 30 may be considered to be "raised and locked" and machine 10 ready to operate. However, if platform 30 were not "raised and locked" a positional state may include "not raised." Upon attempting to place machine 10 in motion (as determined above) an operator may receive a warning (e.g., pop-up warning on information display 26) indicating machine 10 may be unsafe to operate and/or machine 10 may be prevented from operating. Further, transmission (not shown) may be prevented from being shifted into gear and/or park brake (not shown) may be prevented from disengaging when a determination indicative of the "not raised" state is made.

In another example, a pressure sensor associated with park brake (not shown) may provide an indication of park brake state regardless of the operational state of machine 10 (e.g., running/not running). Where the pressure sensor indicates park brake engagement, powered access device 28 may be operated. Where the park brake state is not engaged, powered access device 28 may be prevented from operating.

In yet another example, where an operational state of machine 10 is indicative of machine 10 being in motion and a positional state of platform 30 becomes "not raised" (e.g., latching mechanism failure), an event may be triggered and remain active until transmission is neutralized and park brake applied. Other events may include platform 30 lowered while transmission (not shown) is in gear, platform 30 lowered with park brake (not shown) disengaged, and neutralization of transmission (not shown) due to operation of platform 30.

Additionally, where more than one controller 35 exists, it may be possible to actuate two or more controllers 35 simultaneously. Therefore, algorithms may be provided (e.g., stored in controllers 35 or an ECM) to determine which of controllers' 35 commands should prevail. In one embodiment, a command issued by actuating a controller associated with machine 10 near ground level may prevail. In such an embodiment it may be determined that an operator utilizing a controller 35 at ground level should have priority over other controllers based on safety or other concerns. In another embodiment, other controllers may have priority as desired. One of skill in the art will recognize that numerous factors may be considered when assigning priority to controller commands. It is contemplated that any such arrangement fall within the scope of the present disclosure.

Because the disclosed system and method are directed to a powered access device designed to assist an operator in reaching an elevated entry position of a machine using only two points of contact, an operator ascending to an elevated entry position of a machine may have hands free to carry items (e.g., lunch box, papers, radio, etc.). Further, by designing a powered access device to remain within an existing machine envelope, the powered access device may more easily avoid collisions with external objects (e.g., service bay walls, fuel pumps, passers-by, etc.). Moreover, by including interlocks with machine 10, operation of platform 30 and/or machine 10 may be prevented when such operation may be considered undesirable, thereby increasing overall workplace safety.

It will be apparent to those skilled in the art that various modifications and variations can be made to the disclosed system and methods for a powered access device. Other embodiments will be apparent to those skilled in the art from consideration of the specification and practice of the disclosed systems and methods related to a powered access device. It is intended that the specification and examples be considered as exemplary only, with a true scope being indicated by the following claims and their equivalents.

We claim:

1. A device for accessing an elevated entry position on a machine including an operator position, the device comprising:
   a platform including a step surface, configured to ascend and descend between a base position and the elevated entry position, wherein the platform remains within an existing envelope of the machine throughout ascent, descent, and storage of the platform;
   a lifting mechanism operatively connected to the machine and coupled to a side of the platform such that the platform projects as a cantilever from the lifting mechanism; and
   a latching mechanism including a hydraulic latch actuator configured to close when the platform reaches the elevated position, further including one or controllers associated with the lifting mechanism and including a communicative connection to at least one sensing system configured to sense an operational state of the machine, the operational state including at least one of whether the machine is in motion or whether a parking brake of the machine is engaged, the latching mechanism is communicatively connected to said one or more controllers, wherein the latching mechanism is configured to communicate a positional state of the platform to the controller.

2. The device of claim 1, wherein the one or more controllers include a first controller associated with the platform and a second controller associated with the machine.

3. The device of claim 1, wherein the one or more controllers receive power independent of the operational state of the machine.

4. The device of claim 1, wherein the one or more controls are made inoperative to lower the platform based on the operational state of the machine.

5. The device of claim 1, wherein the lifting mechanism includes:
   a hydraulic cylinder;
   a piston slidably mounted within the hydraulic cylinder and operatively connected to the platform; and
   an electric motor operatively connected to a pump configured to impart motion to a fluid associated with the hydraulic cylinder.

6. The device of claim 1, wherein the latching mechanism further includes a latching component and a latch striker, and the hydraulic latch actuator is configured to cause the latching component to remain engaged to the latch striker until a hydraulic pressure signal is sent to the hydraulic latch actuator to disengage the latching component from the latch striker.

7. The device of claim 1, wherein the one or more controllers is configured to operate the lifting mechanism and move the platform between the base position and the entry position, wherein at least one of the one or more controllers is configured to move the platform from the entry position to the base position only when the machine is not in motion or when the parking brake is engaged, and move the platform from the base position to the entry position irrespective of whether the machine is in motion of the parking brake is not engaged.

8. A device for accessing an elevated entry position on a machine including an operator position, the device comprising:
   a platform configured to ascend and descend between a base position and the elevated entry position, wherein the platform remains within an existing envelope of the machine throughout ascent, descent, and storage of the platform;
   a lifting mechanism coupled to the machine and to the platform;
   a controller configured to operate the lifting mechanism and move the platform between the base position and the entry position, wherein the controller is configured to move the platform from the entry position to the base position only when the machine is not in motion or when the parking brake is engaged, and move the platform from the base position to the entry position irrespective of whether the machine is in motion or the parking brake is not engaged; and
   a latching mechanism including a hydraulic latch actuator configured to close when the platform reaches the entry position, the controller including a communicative connection to at least one sensing system configured to sense an operational state of the machine, the operational state including at least one of whether the machine is in motion or whether a parking brake of the machine is engaged, the latching mechanism is communicatively connected to the controller, wherein the latching mechanism is configured to communicate a positional state of the platform to the controller.

9. A device for accessing an elevated entry position on a machine including an operator position, the device comprising:
   a platform including a step surface, configured to ascend and descend between a base position and an elevated entry position, wherein the platform is a portion of a walkway at the elevated entry position on which an operator may walk on from a first area of the machine to a second area of the machine, and wherein the platform remains within an existing envelope of the machine throughout ascent, descent, and storage of the platform;

a lifting mechanism operatively connected to the machine and coupled to a side of the platform such that the platform projects as a cantilever from the lifting mechanism; and a latching mechanism including a hydraulic latch actuator configured to close when the platform reaches the entry position, further including one or controllers associated with the lifting mechanism and including a communicative connection to at least one sensing system configured to sense an operational state of the machine, the operational state including at least one of whether the machine is in motion or whether a parking brake of the machine is engaged, the latching mechanism is communicatively connected to said one or more controllers, wherein the latching mechanism is configured to communicate a positional state of the platform to the controller.

10. The device of claim 9, wherein the walkway includes a bumper of the machine.

* * * * *